Nov. 14, 1950 R. H. EARLE Re. 23,293
COMBINED LIGHTNING ARRESTER AND FUSE CONSTRUCTION
Original Filed May 13, 1946
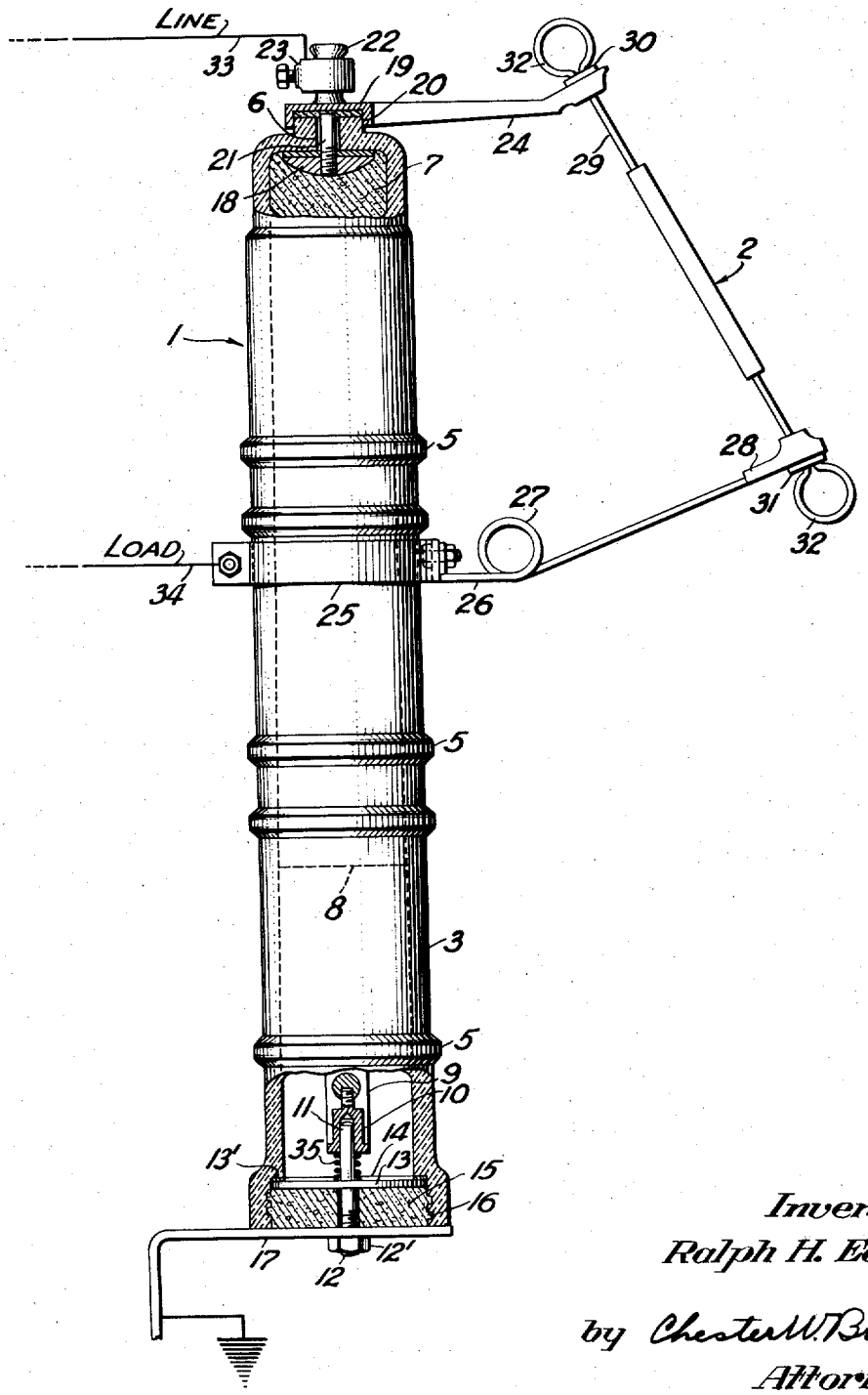
Inventor:
Ralph H. Earle
by Chester W. Brown
Attorney Reissued Nov. 14, 1950 Re. 23,293

UNITED STATES PATENT OFFICE 23,293

COMBINED LIGHTNING ARRESTER AND FUSE CONSTRUCTION

Ralph H. Earle, Wauwatosa, Wis., assignor to McGraw Electric Company, a corporation of Delaware Original No. 2,490,952, dated December 13, 1949, Serial No. 669,256, May 13, 1946. Application for reissue March 17, 1950, Serial No. 150,170

7 Claims. (Cl. 200—115)

Matter enclosed in heavy brackets [ ] appears in the original patent but forms no part of this reissue specification; matter printed in italics indicates the additions made by reissue

This invention relates to a combined lightning arrester and fuse construction.

Objects of this invention are to provide a combined lightning arrester and fuse construction in which the insulating barrel or tube of the lightning arrester is used for two purposes, one of which is to house the arrester itself, namely the spark gaps and the valve material, and the other to support the fuse construction thereby avoiding the expense of providing a separate and distinct support for the fuse.

Further objects are to provide a combined fuse and lightning arrester in which the fuse is carried on the outside of the lightning arrester to render the fuse readily accessible for refusing or inspection and in one form of the invention to so correlate the fuse and lightning arrester construction that there will be no radio interference.

Embodiments of the invention are shown in the accompanying drawings, in which:

Figure 1 is a vertical elevation of a combined lightning arrester and fuse showing one form of the invention with parts of the lightning arrester broken away and in section.

[Figure 2 is a similar view showing a further form of the invention.]

Referring to Figure 1 it will be seen that the lightning arrester is indicated generally by the reference character 1 and the fuse construction by the reference character 2. The lightning arrester comprises an elongated tube 3 of porcelain, glass or other suitable insulating material. It is preferably provided with a series of spaced ribs 5 in accordance with the usual practice and is closed at its upper end except for a small aperture 6. Valve material 7, such as silicon carbide, fills the major portion of the cylinder and may extend down to the dotted line 8, for instance. The lower end of the lightning arrester is provided with a series of spark gaps 9 terminating in a lower fitting or member 10. This lower member is hollow and forms a socket for a conducting rod 11. The conducting rod 11 is formed integral with an enlarged bolt-like bottom portion 12 which is adapted to receive a nut 12'. The housing 3 of the lightning arrester is shouldered as indicated at 13' and a brass or other metal plate 13 is welded, brazed, or otherwise secured to the rod 11. Between the shoulder 12 and the metal plate 13 it is preferable to provide a gasket 14. Insulating cement 15 fills the enlarged lower end of the arrester and interlocks with the tube 3 as the tube is provided with a plurality of annular grooves 16 in accordance with the usual practice. A lower hanger 17 formed of metal is held to the lower portion of the arrester by means of the nut 12'. This hanger is attached to a pole or other suitable support and is grounded as indicated.

The upper end of the arrester is provided with an upper contact member 18 in contact with the upper portion of the valve material 7. A metal cap 19 having downwardly extending flanges overlaps the reduced upper end 20 of the arrester and is provided with an externally threaded pin 21 that extends through the opening 6 in the tube 3 and is screwed into the contact member 18, gaskets being positioned above the contact member 18 and below the cap 19 so as to insure sealing.

The cap 19 forms in reality an upper terminal and may have a projecting portion 22 adapted to receive a clamp or other type of fastener 23. The upper terminal is integral with an upper terminal arm 24, which forms the upper terminal of the fuse structure. At a point intermediate the ends of the tube 3, the lower terminal of the fuse structure is positioned and takes the form of an annular clamp 25 to which a pair of spring arms 26 are secured. These spring arms are each provided with a loop 27 to increase their resiliency, and terminate in an outer lower terminal 28. A fuse link indicated generally at 29 is removably positioned between the upper terminal 24 and the lower terminal 28. The construction of the fuse link and of the upper and lower terminals 24 and 28 and of the spring arms 26 may be like that shown in the patent to Schultz et al., No. 2,311,092 of February 16, 1943, for Repeating cutout construction.

It is to be understood, of course, that in the present invention a single fuse link and an upper and lower terminal assembly is employed. As shown in the patent, the upper terminal 24 and the lower terminal 28 are hook-like members that removably receive the upper and lower terminals 30 and 31 of the fuse link, suitable eyelets 32 being provided at the upper and lower terminals. All of this construction is described in considerable detail in the above noted patent.

The upper terminal of the combined fuse construction and lightning arrester is connected with the high tension line 33 and the lower terminal 25 of the fuse construction is connected to the load line as indicated at 34. The lower terminal of the lightning arrester is the metal bracket 17 which is grounded.

It is to be noted that other means may be provided for supporting the combined lightning arrester and fuse construction. For instance, a hanger may be used to encircle a portion of the tube 3 of the lightning arrester and may be attached to a pole or other support in the usual manner. [Such a hangar is illustrated in Figure 2 hereinafter described.]

It is to be noted that the insulating tube 3 of the lightning arrester provides a very firm and adequate support for the fuse construction which latter in no way interferes with the correct operation of the lightning arrester. Similarly, the lightning arrester does not interfere with the correct action of the fuse.

When an overload occurs, the fuse link is ruptured and the lower terminal 28, which is spring urged downwardly by the resilient arms 26, quickly separates any remaining portion of the fuse link and throws the lower portion of the fuse link downwardly away from the apparatus.

This form of the invention is free from radio disturbance as it will be seen that the terminal 19, 24 of the fuse construction and lightning arrester and the lower terminal 25 of the fuse construction are at line potential, and the lower terminal 25 of the fuse construction is adjacent the valve material, all of which valve material is at line potential. Thus, there is no radio disturbance produced by this construction.

It is to be noted that the pin 11 and socket or fitting 10 at the lower end of the lightning arrester provide ease in assembly and form a means of connecting the lower terminal 17 with the lowest member of the spark gap assembly. A spring 35 is positioned around the pin 11 and below the fitting 10 and holds the spark gap assembly 9 upwardly in contact with the valve material.

[The form of the invention shown in Figure 2 is very much like that described in connection with Figure 1 except that the position of the spark gap and valve material is reversed. The valve material is indicated by the reference character 36 in Figure 2 and the spark gap assembly by the reference character 37. The fuse assembly is substantially as hereinbefore described and is indicated generally by the reference character 38. Its lower terminal 39 is clamped about the tube 40 of the lightning arrester in exactly the same manner as previously described. The lower end of the lightning arrester shown in Figure 2 may be provided with a downwardly projecting annular flange 41 which contacts with a sealing metal plate 42. If desired, a gasket may be positioned between the plate 42 and the flange 41. This metal plate is welded, brazed or otherwise secured to a pin 43 whose upper end is threaded and is screwed into the contact member 44 which engages the lower portion of the valve material, a suitable gasket being positioned between the contact member 44 and the transverse web 45 of the tube 40. The upper end of the tube 40 is closed by a metal cap 46 which is spun over the beaded upper end 47 of the tube 40 in the usual manner, a suitable gasket, not shown, being provided.]

[A second rib or bead 48 is positioned below the bead 47 and a circular clamping metal member 49 encircles the tube 40 between the beads 47 and 48 and carries the terminal 50 of the fuse construction, a suitable metal jumper 51 being bolted at its lower end to the terminal 50 and soldered, brazed, or othewrise secured to the metal cap 46. The metal cap 46 is connected to the high tension line 52 in any suitable way and the lower terminal 39 of the fuse construction is connected to the load line 53 in any suitable manner. The lower metal plate 42 or lower terminal of the lightning arrester is provided with a connector 54 of any suitable type, which is connected to the ground as indicated.]

[Any suitable supporting means may be provided, such as the circular clamping hanger 55 which is adapted to be attached to any support.]

It is to be understood that other types of fuse constructions could be employed if desired without departing from the spirit of this invention. However, the type of fuse assembly disclosed is eminently suitable as it is of light weight and as it throws the lower end of the fuse link downwardly away from the high tension line when rupture occurs. This invention is primarily concerned with the unitary assembly of a lightning arrester and a fuse in which advantage is taken of the excellent insulation afforded by the elongated insulating tube of the lightning arrester to directly support a fuse assembly and to provide ample insulation not only between the terminals of the fuse assembly but also between the supporting means, such as the hanger and the other terminals of the assembly.

It is to be noted that the fuse link assembly does not span the entire length of the elongated insulating tube but, instead, spans only a part thereof.

Although this invention has been described in considerable detail, it is to be understood that such description is intended as illustrative rather than limiting, as the invention may be variously embodied and is to be interpreted as claimed.

I claim:

1. A combined fuse construction and lightning arrester comprising an elongated insulating tube having an upper terminal adapted to be connected to a line and a bottom terminal adapted to be connected to the ground and having an intermediate terminal, valve material located within said tube and extending from the upper terminal to a point below the intermediate terminal, spark gap means connected to the lower end of said valve material and extending to the bottom terminal, and a fuse link connected between said upper and intermediate terminals and being spaced from said spark gap means longitudinally of said elongated insulating tube.

2. A combined fuse construction and lightning arrester comprising an elongated insulating tube, a rigid upper terminal assembly carried by the upper end of said tube and adapted to be connected to a line and having fuse link engaging means, an intermediate load terminal having a portion encircling an intermediate part of said tube and having a resilient outwardly extending portion terminating in fuse link engaging means, a fuse link between said fuse link engaging means, a bottom terminal adapted to be connected to the ground, and valve material and a spark gap assembly connected in series between the upper terminal assembly and the bottom terminal and located within said tube with the valve material extending downwardly from the upper terminal to a point below the intermediate terminal, said fuse link being spaced from said spark gap assembly longitudinally of said elongated insulating tube.

3. A combined fuse construction and lightning arrester comprising an elongated insulating tube, a rigid upper terminal assembly carried by the upper end of said tube and adapted to be connected to a line and having fuse link engaging means, an intermediate load terminal having a portion encircling an intermediate part of said tube and having a resilient outwardly extending portion terminating in fuse link engaging means, a fuse link between said fuse link engaging means, a bottom terminal adapted to be connected to the ground, valve material and a spark gap assembly connected in series between the upper terminal assembly and the bottom terminal and located within said tube with the valve material extending downwardly from the upper terminal to a point below the intermediate terminal, said fuse link being spaced from said spark gap assembly longitudinally of said elongated insulating tube, said spark gap assembly having a slidable connection with said lower terminal, and spring means urging said spark gap assembly upwardly to maintain contact with said valve material.

*4. In a combined fuse construction and lightning arrester assembly, the combination with an elongated insulating tube having a line terminal at one end provided with a fuse link engaging contact, a grounding terminal at the other end, and a load terminal intermediate said ends provided with a resilient outwardly extending portion terminating in a fuse link engaging contact, said terminals insulated from each other by said tube and said grounding terminal serving as a support for said assembly, of valve material in said tube connected to said line terminal and extending to a point between said load terminal and said grounding terminal and a gap assembly in series with said valve material and said grounding terminal, whereby a fuse link suspended between said fuse link engaging contacts will be spaced from said spark gap assembly longitudinally of said elongated insulating tube.*

*5. In a combination fuse construction and lightning arrester assembly, the combination with an elongated insulating tube having a line terminal at one end provided with a fuse link engaging contact, a grounding conductor at the other end, and a load terminal intermediate said ends provided with a resilient outwardly extending portion terminating in a fuse link engaging contact, said line terminal, load terminal and conductor insulated from each other by said tube, of an arrester assembly including a spark gap having an electrode electrically connected to said line terminal and normally at substantially the same potential as said line and load terminals and having a grounding electrode connected to said grounding conductor, said gap disposed in said tube at a point between said load terminal and said grounding conductor, whereby a fuse link suspended between said contacts is spaced from said gap longitudinally of said elongated tube.*

*6. In a combined fuse construction and lightning arrester assembly, the combination with an elongated insulating tube having a line terminal at one end including a fuse link engaging contact, said line terminal exposed interiorly and exteriorly of said tube and a second terminal mounted on said tube intermediate the ends thereof and including a fuse link engaging contact, of a spark gap disposed in said tube, said gap having one electrode electrically connected to said line terminal and normally at substantially the same potential as said terminals and having a second electrode at the other end of said tube including a conductive element extending to the exterior of said tube for cooperation with a grounded connection the electrodes of said gap being positioned between said second terminal and said conductive element.*

*7. In a combined fuse construction and lightning arrester assembly, the combination with an elongated insulating tube having a line terminal at its upper end including a fuse engaging contact, said line terminal exposed interiorly and exteriorly of said tube, a second terminal mounted on and intermediate the ends of said tube and having a fuse engaging contact, of an arrester assembly mounted in said tube including a gap and having current limiting characteristics, said gap disposed below said second terminal and having one electrode electrically connected to said line terminal and also having a second electrode including a conductive element exteriorly of the end of said tube opposed to the first mentioned end, said conductive element and second electrode being insulated from each other and from said line terminal by said tube.*

RALPH H. EARLE.

REFERENCES CITED

The following references are of record in the file of this patent or the original patent:

UNITED STATES PATENTS

| Number | Name | Date |
|---|---|---|
| 1,159,205 | Frank | Nov. 2, 1915 |
| 1,873,499 | Steinmayer | Aug. 23, 1932 |
| 1,939,371 | Spurgeon | Dec. 12, 1933 |
| 2,185,105 | Hill | Dec. 26, 1939 |
| 2,376,996 | Fox | May 29, 1945 |